US012735621B2

(12) United States Patent
Alanqari et al.

(10) Patent No.: US 12,735,621 B2
(45) **Date of Patent: *Sep. 15, 2026**

(54) METHODS OF SERVICING A WELLBORE USING A VOLCANIC ASH SEALANT COMPOSITION

(71) Applicant: Saudi Arabian Oil Company, Dhahran (SA)

(72) Inventors: Khawlah Alanqari, Al Khobar (SA); Abdullah Saleh Hussain Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,331

(22) Filed: Jan. 6, 2025

(65) Prior Publication Data

US 2026/0193516 A1 Jul. 9, 2026

(51) Int. Cl.
*E21B 43/34* (2006.01)
*C09K 8/467* (2006.01)

(52) U.S. Cl.
CPC .................................... *C09K 8/467* (2013.01)

(58) Field of Classification Search
CPC .......... C09K 8/467; E21B 43/34; E21B 43/13
USPC .......................................................... 166/293
See application file for complete search history.

(56) References Cited

U.S. PATENT DOCUMENTS 3,576,211 A 4/1971 Goodwin
3,625,287 A 12/1971 Young
4,411,801 A 10/1983 Pomerleau
4,547,298 A 10/1985 Novak
4,924,942 A 5/1990 Shen
5,911,282 A 6/1999 Onan et al.
6,448,206 B1 9/2002 Griffith et al.
7,488,705 B2 * 2/2009 Reddy .................... C09K 8/508 507/119
7,723,273 B1 * 5/2010 Zaid ..................... C08G 59/504 507/239
7,789,150 B2 * 9/2010 Roddy ................... C09K 8/473 166/309
8,157,009 B2 4/2012 Patil et al.
8,307,916 B1 11/2012 Wald
9,410,066 B2 8/2016 Ghassemzadeh
9,701,885 B2 7/2017 Husein et al.
9,828,293 B2 11/2017 Yadav et al.
10,005,930 B2 * 6/2018 Reddy .................. C08G 59/504
10,081,755 B2 9/2018 Ballard
10,138,405 B2 11/2018 Kulkarni et al.

(Continued)

FOREIGN PATENT DOCUMENTS

CN 113880502 A 1/2022
CN 113248792 B 4/2022

(Continued)

OTHER PUBLICATIONS

U.S. Appl. No. 19/010,304, filed Jan. 6, 2025, Alanqari et al.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

This disclosure methods of servicing a wellbore using a sealant composition, including volcanic ash, cement, an epoxy resin, and a crosslinker.

17 Claims, 1 Drawing Sheet

(56) References Cited

U.S. PATENT DOCUMENTS

| | | | | |
|---|---|---|---|---|
| 10,144,858 | B2 * | 12/2018 | Kennedy | C04B 24/425 |
| 10,767,100 | B2 * | 9/2020 | Gamwell | C04B 28/02 |
| 10,920,121 | B1 | 2/2021 | Alanqari et al. | |
| 11,066,899 | B1 * | 7/2021 | Alanqari | E21B 21/003 |
| 11,624,020 | B1 | 4/2023 | Alanqari et al. | |
| 2010/0044043 | A1 | 2/2010 | Roddy | |
| 2015/0284621 | A1 * | 10/2015 | Marchesini | E21B 33/138 166/293 |
| 2015/0315875 | A1 | 11/2015 | Chatterji et al. | |
| 2015/0353831 | A1 | 12/2015 | Rocktaschel et al. | |
| 2017/0247598 | A1 | 8/2017 | Kennedy et al. | |
| 2017/0306211 | A1 | 10/2017 | Pisklak et al. | |
| 2017/0369762 | A1 | 12/2017 | Martinez et al. | |
| 2018/0273825 | A1 | 9/2018 | Brown et al. | |
| 2020/0071593 | A1 | 3/2020 | Al-Yami et al. | |
| 2020/0071596 | A1 | 3/2020 | Al-Yami et al. | |
| 2020/0071598 | A1 | 3/2020 | Al-Yami et al. | |
| 2020/0131427 | A1 | 4/2020 | Alsaihati et al. | |
| 2020/0339863 | A1 | 10/2020 | Wagle et al. | |
| 2021/0189218 | A1 | 6/2021 | Al-Yami et al. | |
| 2021/0261851 | A1 | 8/2021 | Singh et al. | |
| 2021/0292231 | A1 | 9/2021 | Alanqari et al. | |
| 2022/0056233 | A1 | 2/2022 | Wagle et al. | |
| 2022/0073807 | A1 | 3/2022 | Wagle et al. | |
| 2022/0267664 | A1 | 8/2022 | Al-Safran et al. | |
| 2023/0295484 | A1 | 9/2023 | Al-Safran | |
| 2024/0254380 | A1 | 8/2024 | Li et al. | |

FOREIGN PATENT DOCUMENTS

| | | | |
|---|---|---|---|
| NO | 20170210 | A1 | 2/2017 |
| WO | WO 2014036218 | A1 | 3/2014 |
| WO | WO 2016043979 | A1 | 3/2016 |
| WO | WO 2016048303 | A1 | 3/2016 |
| WO | WO 2021173187 | A1 | 9/2021 |
| WO | WO 2021188154 | A1 | 9/2021 |
| WO | WO 2024092303 | A1 | 5/2024 |

OTHER PUBLICATIONS

U.S. Appl. No. 19/010,313, filed Jan. 6, 2025, Alanqari et al.
U.S. Appl. No. 19/010,352, filed Jan. 6, 2025, Alanqari et al.
U.S. Appl. No. 19/010,366, filed Jan. 6, 2025, Alanqari et al.
U.S. Appl. No. 19/010,384, filed Jan. 6, 2025, Alanqari et al.
U.S. Appl. No. 19/010,471, filed Jan. 6, 2025, Alanqari et al.
U.S. Appl. No. 19/010,486, filed Jan. 6, 2025, Alanqari et al.
U.S. Appl. No. 19/010,540, filed Jan. 6, 2025, Alanqari et al.
U.S. Appl. No. 19/010,567, filed Jan. 6, 2025, Alanqari et al.
U.S. Appl. No. 19/010,584, filed Jan. 6, 2025, Alanqari et al.
U.S. Appl. No. 19/010,595, filed Jan. 6, 2025, Alanqari et al.
U.S. Appl. No. 19/010,766, filed Jan. 6, 2025, Alanqari et al.
U.S. Appl. No. 19/010,786, filed Jan. 6, 2025, Alanqari et al.
U.S. Appl. No. 19/010,922, filed Jan. 6, 2025, Alanqari et al.
U.S. Appl. No. 19/010,981, filed Jan. 6, 2025, Alanqari et al.
American Petroleum Institute, "Recommended Practice For Field Testing Water-Based Dilling Fluids," API, RP 13B-1/ISO 10414-1:2008, Mar. 2009, pp. ii-91, 104 pages.
International Search Report and Written Opinion in International Appln. No. PCT/US2025/061801, mailed on Mar. 17, 2026, 16 pages.
International Search Report and Written Opinion in International Appln. No. PCT/US2026/010005, mailed on Mar. 17, 2026, 16 pages.
International Search Report and Written Opinion in International Appln. No. PCT/US2026/010094, mailed on Mar. 17, 2026, 17 pages.
International Search Report and Written Opinion in International Appln. No. PCT/US2026/010170, mailed on Mar. 17, 2026, 17 pages.
International Search Report and Written Opinion in International Appln. No. PCT/US2026/010172, mailed on Mar. 19, 2026, 17 pages.
International Search Report and Written Opinion in International Appln. No. PCT/US2026/010233, mailed on Mar. 20, 2026, 18 pages.
Material Safety Data Sheet, "Le Supermul," Halliburton, Dec. 20, 2012, 7 pages.

* cited by examiner

METHODS OF SERVICING A WELLBORE USING A VOLCANIC ASH SEALANT COMPOSITION

TECHNICAL FIELD

This document relates to methods of servicing a wellbore using a sealant composition, including volcanic ash, cement, an epoxy resin, and a crosslinker.

BACKGROUND

Volcanic ash, a material composed of fragments of rock, mineral crystals, and volcanic glass, is produced during volcanic eruptions. Deposits of volcanic ash cover about 1% of the earth's surface and are easily accessible by conventional mining techniques.

Because of its abundance and chemical composition, volcanic ash has been investigated as a building material. Early investigations showed that volcanic ash can be incorporated into compositions to form hard, rigid materials when first activated by a strong base. incorporation of volcanic ash into the sealant composition allows for the generation of a hard, rigid material that can be used in place of conventional cement. However, the use of a strong base, such as 10 to 14 molar sodium hydroxide, potassium hydroxide, or sodium silicate, is not desirable, due to health and safety risks associated with handling strong bases.

Thus, the development of new uses and processes using volcanic ash, particularly those that do not use strong acids or bases, is desirable.

Primary well cementing is the process of pumping cement slurry down the annulus between the casing and wellbore to form a cement sheath that will ensure zonal isolation, support the casing and liner, and protect the casing from corrosive fluids. Failure of the bonded cement to perform such functions can result in contamination of fresh water aquifers, loss of hydrocarbon reserves in producing wells, loss of injected fluids in injector wells, sustained casing pressure or even a blowout. Secondary well cementing, often referred to as squeeze cementing, is the process of applying a sealant composition strategically to the wellbore to plug voids or cracks in the conduit, to plug voids or cracks in the hardened sealant residing in the annulus, to plug relatively small openings known as a microannulus between the hardened sealant and the conduit, and so forth.

Thus, the development of sealant formulations for primary cementing applications is desirable.

SUMMARY

Provided in the present disclosure are methods of servicing a wellbore, including:

applying a sealant composition to the wellbore, the sealant composition including:
- volcanic ash;
- cement;
- an epoxy resin; and
- a crosslinker.

In some embodiments, the sealant composition includes from about 0.01 wt % to about 75 wt % volcanic ash.

In some embodiments, the sealant composition includes from about 1 wt % to about 5 wt % volcanic ash.

In some embodiments, about 80% of the volcanic ash particles have a diameter of less than about 60 µm.

In some embodiments, the sealant composition includes from about 50 wt % to about 97 wt % epoxy resin.

In some embodiments, the sealant composition includes from about 85 wt % to about 95 wt % epoxy resin.

In some embodiments, the epoxy resin includes:

an aliphatic epoxy resin of formula (I):

(I)

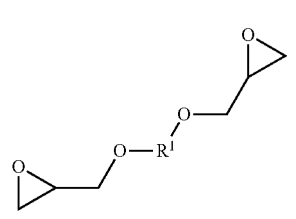

where $R^1$ is $C_{4-24}$ hydrocarbylenyl;

an alkyl glycidyl ether of formula (II):

(II)

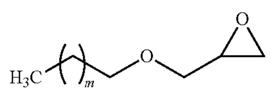

where m is an integer from 10 to 12;

a bisphenol-A-based epoxy resin;

a bisphenol-F-based epoxy resin;

a Novalak resin; or combinations thereof.

In some embodiments, the epoxy resin includes 1,6-hexanediol diglycidyl ether, butyl glycidyl ether, 2,3-epoxypropyl o-tolyl ether, cyclohexanedimethanol diglydicyl ether, bisphenol-A-epichlorohydrin epoxy, resin-2254, or combinations thereof.

In some embodiments, the epoxy resin further includes a reactive diluent selected from:

a cardanol glycidyl ether derivative;

an aliphatic monoglycidyl ether of a $C_{13-15}$ alcohol;

a compound of formula (III):

(III)

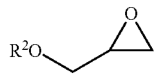

where $R^2$ is a $C_{12-14}$ hydrocarbyl;

or a combination thereof.

In some embodiments, the epoxy resin includes bisphenol-A-(epichlorohydrin) epoxy resin and an oxirane mono [($C_{12-14}$)-alkyloxy)methyl]derivative.

In some embodiments, the sealant composition includes from about 1 wt % to about 5 wt % crosslinker selected from trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine (POPDA), and combinations thereof.

In some embodiments, the sealant composition further includes an accelerator, retarder, and/or weighting material.

In some embodiments, the sealant composition further includes an emulsifier selected from Table 3.

In some embodiments, the sealant composition includes from about 0.01 wt % to about 50 wt % emulsifier.

In some embodiments, the sealant composition includes from about 1 wt % to about 10 wt % cement.

In some embodiments, the sealant composition includes:
- about 1 wt % to about 10 wt % volcanic ash;
- about 1 wt % to about 10 wt % cement;
- about 70 wt % to about 97 wt % epoxy resin; and
- about 1 wt % to about 10 wt % crosslinker.

In some embodiments, the sealant composition includes:
- about 1 wt % to about 10 wt % volcanic ash;
- about 1 wt % to about 10 wt % cement;
- about 70 wt % to about 97 wt % bisphenol-A-epichlorohydrin epoxy resin including an oxirane mono [($C_{12-14}$)-alkyloxy)methyl]derivative; and
- about 1 wt % to about 10 wt % diethylenetriamine (DETA).

In some embodiments, the method further includes:
- mixing the epoxy resin and the crosslinker to form a liquid mixture; and
- adding the volcanic ash and cement to the liquid mixture to form the sealant composition;

before applying the sealant composition to the wellbore.

In some embodiments, an emulsifier is mixed with the epoxy resin and the crosslinker to form the liquid mixture.

In some embodiments, the liquid mixture is mixed for about 3 min to about 5 min to form the liquid mixture; and
- the sealant composition is mixed for about 3 min to about 5 min after adding the volcanic ash and cement.

DETAILED DESCRIPTION

Figure 1:
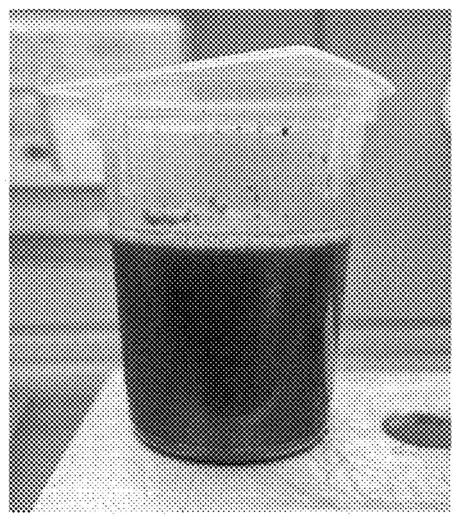
FIG. 1 is a photograph showing an exemplary sealant composition including volcanic ash, cement, resin-2254 as the epoxy resin, and Razeen cure-931 as the crosslinker in liquid form in a plastic cup.

The present disclosure relates to sealant compositions including volcanic ash, cement, an epoxy resin, and a crosslinker that can be used for methods of servicing a wellbore. The incorporation of volcanic ash into the sealant composition allows for the generation of a hard, rigid gel that can be used for primary and secondary cementing applications.

In some embodiments, the incorporation of volcanic ash into the sealant compositions produces a hard, rigid material. In some embodiments, the incorporation of volcanic ash into the sealant compositions produces a material with desirable mechanical, thermal, and chemical properties. In some embodiments, the incorporation of volcanic ash into the sealant compositions produces a material with resistance to high temperatures and acids.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

The term "about" as used herein can allow for a degree of variability in a value or range, for example, within 10% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Volcanic Ash

The sealant compositions of the present disclosure include volcanic ash. In some embodiments, the sealant composition includes about 0.01 percentage by weight (wt %) to about 75 wt %, about 0.05 wt % to about 60 wt %, about 0.1 wt % to about 50 wt %, about 1.0 wt % to about 40 wt %, about 2.0 wt % to about 30 wt %, about 3.0 wt % to about 20 wt %, about 4.0 wt % to about 10 wt %, or about 5.0 wt % to about 8.0 wt % volcanic ash. In some embodiments, the sealant composition includes about 0.01 wt % to about 75 wt % volcanic ash. In some embodiments, the sealant composition includes about 0.05 wt % to about 60 wt % volcanic ash. In some embodiments, the sealant composition includes about 0.1 wt % to about 50 wt % volcanic ash. In some embodiments, the sealant composition includes about 1.0 wt % to about 40 wt % volcanic ash. In some embodiments, the sealant composition includes about 2.0 wt % to about 30 wt % volcanic ash. In some embodiments, the sealant composition includes about 3.0 wt % to about 20 wt % volcanic ash. In some embodiments, the sealant composition includes about 4.0 wt % to about 10 wt % volcanic ash. In some embodiments, the sealant composition includes about 5.0 wt % to about 8.0 wt % volcanic ash.

In some embodiments, the sealant composition includes about 0.05 wt % to about 75 wt %, about 5 wt % to about 75 wt %, about 10 wt % to about 75 wt %, about 25 wt % to about 75 wt %, or about 50 wt % to about 75 wt % volcanic ash. In some embodiments, the sealant composition includes about 0.05 wt % to about 75 wt % volcanic ash. In some embodiments, the sealant composition includes about 5 wt % to about 75 wt % volcanic ash. In some embodiments, the sealant composition includes about 10 wt % to about 75 wt % volcanic ash. In some embodiments, the sealant composition includes about 25 wt % to about 75 wt % volcanic ash. In some embodiments, the sealant composition includes about 50 wt % to about 75 wt % volcanic ash.

In some embodiments, the sealant composition includes about 0.01 wt % to about 50 wt %, about 0.01 wt % to about 25 wt %, about 0.01 wt % to about 15 wt %, about 0.01 wt % to about 10 wt %, or about 0.01 wt % to about 5 wt % volcanic ash. In some embodiments, the sealant composition includes about 0.01 wt % to about 50 wt % volcanic ash. In some embodiments, the sealant composition includes about 0.01 wt % to about 25 wt % volcanic ash. In some embodiments, the sealant composition includes about 0.01 wt % to about 15 wt % volcanic ash. In some embodiments, the sealant composition includes about 0.01 wt % to about 10 wt % volcanic ash. In some embodiments, the sealant composition includes about 0.01 wt % to about 5 wt % volcanic ash.

In some embodiments, the sealant composition includes about 0.1 wt % to about 10 wt %, about 1 wt % to about 9 wt %, about 1.5 wt % to about 8 wt %, about 2 wt % to about 7 wt %, about 2.5 wt % to about 6 wt %, or about 3 wt % to about 5 wt % volcanic ash.

In some embodiments, the sealant composition includes about 0.1 wt % to about 10 wt % volcanic ash. In some embodiments, the sealant composition includes about 1 wt % to about 9 wt % volcanic ash. In some embodiments, the sealant composition includes about 1.5 wt % to about 8 wt % volcanic ash. In some embodiments, the sealant composition includes about 2 wt % to about 7 wt % volcanic ash. In some embodiments, the sealant composition includes about 2.5 wt % to about 6 wt % volcanic ash. In some embodiments, the sealant composition includes about 3 wt % to about 5 wt % volcanic ash.

In some embodiments, the sealant composition includes about 0.1 wt % to about 5.9 wt %, about 0.5 wt % to about 5.5 wt %, about 1 wt % to about 5 wt %, about 2 wt % to about 4.5 wt %, or about 2.5 wt % to about 4.0 wt % volcanic ash. In some embodiments, the sealant composition includes about 0.1 wt % to about 5.9 wt % volcanic ash. In some embodiments, the sealant composition includes about 0.5 wt % to about 5.5 wt % volcanic ash. In some embodiments, the sealant composition includes about 1 wt % to about 5 wt % volcanic ash. In some embodiments, the sealant composition includes about 2 wt % to about 4.5 wt % volcanic ash. In some embodiments, the sealant composition includes about 2.5 wt % to about 4.0 wt % volcanic ash.

In some embodiments, the sealant composition includes about 2.7 wt % volcanic ash. In some embodiments, the sealant composition includes about 4.0 wt % volcanic ash.

In some embodiments, about 50% of the volcanic ash particles have a diameter of about 60 micrometers (μm) or less. In some embodiments, about 60% of the volcanic ash particles have a diameter of about 60 μm or less. In some embodiments, about 70% of the volcanic ash particles have a diameter of about 60 μm or less. In some embodiments, about 80% of the volcanic ash particles have a diameter of about 60 μm or less. In some embodiments, about 90% of the volcanic ash particles have a diameter of about 60 μm or less.

In some embodiments, the volcanic ash particles are about 10 μm to about 100 μm, about 20 μm to about 90 μm, about 30 μm to about 80 μm, about 40 μm to about 70 μm, or about 50 μm to about 60 μm in diameter. In some embodiments, the volcanic ash particles are about 10 μm to about 100 μm in diameter. In some embodiments, the volcanic ash particles are about 20 μm to about 90 μm in diameter. In some embodiments, the volcanic ash particles are about 30 μm to about 80 μm in diameter. In some embodiments, the volcanic ash particles are about 40 μm to about 70 μm in diameter. In some embodiments, the volcanic ash particles are about 50 μm to about 60 μm in diameter.

In some embodiments, the volcanic ash particles are about 10 μm in diameter. In some embodiments, the volcanic ash particles about 20 μm in diameter. In some embodiments, the volcanic ash particle size is about 30 μm in diameter. In some embodiments, the volcanic ash particle size is about 40 μm in diameter. In some embodiments, the volcanic ash particle size is about 50 μm in diameter. In some embodiments, the volcanic ash particle size is about 60 μm in diameter. In some embodiments, the volcanic ash particle size is about 70 μm in diameter. In some embodiments, the volcanic ash particle size is about 80 μm in diameter. In some embodiments, the volcanic ash particle size is about 90 μm. In some embodiments, the volcanic ash particle size is about 100 μm in diameter.

In some embodiments, about 80% of the volcanic ash particles have a diameter of about 10 μm or less. In some embodiments, about 80% of the volcanic ash particles have a diameter of about 20 μm or less. In some embodiments, about 80% of the volcanic ash particles have a diameter of about 30 μm or less. In some embodiments, about 80% of the volcanic ash particles have a diameter of about 40 μm or less. In some embodiments, about 80% of the volcanic ash particles have a diameter of about 50 μm or less. In some embodiments, about 80% of the volcanic ash particles have a diameter of about 60 μm or less. In some embodiments, about 80% of the volcanic ash particles have a diameter of about 70 μm or less. In some embodiments, about 80% of the volcanic ash particles have a diameter of about 80 μm or less. In some embodiments, about 80% of the volcanic ash particles have a diameter of about 90 μm or less. In some embodiments, about 80% of the volcanic ash particles have a diameter of about 100 μm or less.

In some embodiments, the volcanic ash includes a plurality of oxides. In some embodiments, the volcanic ash includes calcium oxide (CaO), silicon dioxide ($SiO_2$), aluminum oxide ($Al_2O_3$), iron III oxide ($Fe_2O_3$), magnesium oxide (MgO), potassium oxide ($K_2O$), and combinations thereof. In some embodiments, the volcanic ash includes a plurality of oxides. In some embodiments, the volcanic ash includes calcium oxide (CaO), silicon dioxide ($SiO_2$), aluminum oxide ($Al_2O_3$), iron III oxide ($Fe_2O_3$), magnesium oxide (MgO), and potassium oxide ($K_2O$). In some embodiments, the volcanic ash includes calcium oxide (CaO). In some embodiments, the volcanic ash includes silicon dioxide ($SiO_2$). In some embodiments, the volcanic ash includes aluminum oxide ($Al_2O_3$). In some embodiments, the volcanic ash includes iron III oxide ($Fe_2O_3$). In some embodiments, the volcanic ash includes magnesium oxide (MgO). In some embodiments, the volcanic ash includes potassium oxide ($K_2O$).

In some embodiments, the volcanic ash includes oxygen (O), silicon (Si), aluminum (Al), iron (Fe), calcium (Ca), magnesium (Mg), sodium (Na), titanium (Ti), potassium (K), phosphorus (P), and manganese (Mn). In some embodiments, the volcanic ash includes oxygen (O). In some embodiments, the volcanic ash includes silicon (Si). In some embodiments, the volcanic ash includes aluminum (Al). In some embodiments, the volcanic ash includes iron (Fe). In some embodiments, the volcanic ash includes calcium (Ca).

In some embodiments, the volcanic ash includes magnesium (Mg). In some embodiments, the volcanic ash includes sodium (Na). In some embodiments, the volcanic ash includes titanium (Ti). In some embodiments, the volcanic ash includes potassium (K). In some embodiments, the volcanic ash includes phosphorus (P). In some embodiments, the volcanic ash includes manganese (Mn).

Epoxy Resin

The sealant compositions of the present disclosure contain an epoxy resin. The type of epoxy resin and the concentration of the epoxy resin in the sealant composition may affect the viscosity of the sealant composition before setting.

The epoxy resin may have a viscosity that enables the sealing composition to be prepared at the surface and pumped downhole into a wellbore. In some embodiments, the epoxy resin has a viscosity that enables introduction of the sealing composition having the epoxy resin into a wellbore.

In some embodiments, the sealant composition includes about 30 wt % to about 99 wt %, about 50 wt % to about 98 wt %, about 70 wt % to about 97 wt %, about 80 wt % to about 95 wt %, or about 85 wt % to about 90 wt % epoxy resin. In some embodiments, the sealant composition includes about 30 wt % to about 99 wt % epoxy resin. In some embodiments, the sealant composition includes about 50 wt % to about 98 wt % epoxy resin. In some embodiments, the sealant composition includes about 70 wt % to about 97 wt % epoxy resin. In some embodiments, the sealant composition includes about 80 wt % to about 95 wt % epoxy resin. In some embodiments, the sealant composition includes about 85 wt % to about 90 wt % epoxy resin. In some embodiments, the sealant composition includes about 85 wt % to about 95 wt % epoxy resin.

In some embodiments, the sealant composition includes about 88.5 wt % epoxy resin.

In some embodiments, the epoxy resin includes an aliphatic epoxy resin, an alkyl glycidyl ether, a bisphenol-A-based epoxy resin, a bisphenol-F-based epoxy resin, a Novalak resin, or a combination thereof.

In some embodiments, the epoxy resin includes:

an aliphatic epoxy resin of formula (I):

(I)

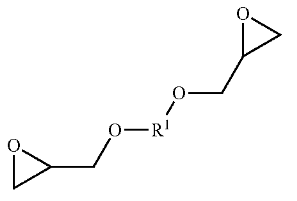

where $R^1$ is $C_{4-24}$ hydrocarbylenyl;

an alkyl glycidyl ether of formula (II):

(II)

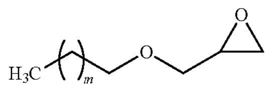

where m is an integer 10 to 12;

a bisphenol-A-based epoxy resin;

a bisphenol-F-based epoxy resin;

a Novalak resin; or combinations thereof.

In some embodiments, the epoxy resin includes an aliphatic epoxy resin of formula (I):

(I)

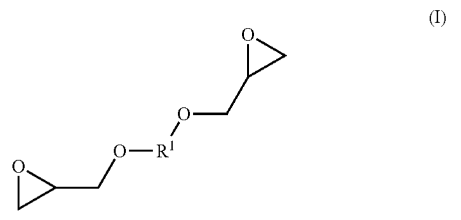

where $R^1$ is $C_{4-24}$ hydrocarbylenyl.

In some embodiments, the epoxy resin is of formula (I) and $R^1$ is $C_{4-20}$ hydrocarbylenyl, $C_{4-16}$ hydrocarbylenyl, $C_{4-12}$ hydrocarbylenyl, $C_{4-8}$ hydrocarbylenyl, $C_{6-24}$ hydrocarbylenyl, $C_{6-20}$ hydrocarbylenyl, $C_{6-16}$ hydrocarbylenyl, or $C_{6-16}$ hydrocarbylenyl.

In some embodiments, $R^1$ is $C_{4-24}$ alkylenyl. In some embodiments, $R^1$ is $C_{4-24}$ alkenylenyl. In some embodiments, $R^1$ is $C_{4-24}$ alkynylenyl. In some embodiments, $R^1$ is $C_{4-24}$ cycloalkylenyl. In some embodiments, $R^1$ is $C_{4-24}$ arylenyl.

In some embodiments, $R^1$ is butylenyl. In some embodiments, $R^1$ is pentylenyl. In some embodiments, $R^1$ is hexylenyl. In some embodiments, $R^1$ is heptylenyl. In some embodiments, $R^1$ is octylenyl.

In some embodiments, the epoxy resin includes an alkyl glycidyl ether of formula (II):

(II)

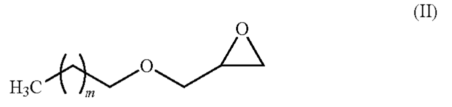

where m is an integer 10 to 12.

In some embodiments, m is 10. In some embodiments, m is 11. In some embodiments, m is 12.

In some embodiments, the epoxy resin includes a bisphenol-A-based epoxy resin.

In some embodiments, the epoxy resin includes a bisphenol-F-based epoxy resin.

In some embodiments, the epoxy resin includes a Novalak resin.

In some embodiments, the epoxy resin includes 1,6-hexanediol diglycidyl ether, butyl glycidyl ether, 2,3-epoxypropyl o-tolyl ether, cyclohexanedimethanol diglydicyl ether, bisphenol-A-epichlorohydrin epoxy, or combinations thereof. In some embodiments, the epoxy resin includes 1,6-hexanediol diglycidyl ether. In some embodiments, the epoxy resin includes butyl glycidyl ether. In some embodiments, the epoxy resin includes 2,3-epoxypropyl o-tolyl ether. In some embodiments, the epoxy resin includes cyclohexanedimethanol diglydicyl ether. In some embodiments, the epoxy resin includes bisphenol-A-epichlorohydrin epoxy.

An epoxy resin may have an epoxy equivalent weight. In some embodiments, the epoxy equivalent weight is equal to the molecular weight of the epoxy resin divided by the average number of epoxy groups in the epoxy resin. In some embodiments, the epoxy equivalent weight of an epoxy resin may be determined according to the ASTM-D1652 method.

In some embodiments, the epoxy resin has an epoxy equivalent weight of about 100 to about 500, about 150 to about 450, about 200 to about 400, or about 250 to about 350 epoxy equivalents per gram. In some embodiments, the epoxy resin has an epoxy equivalent weight of about 100 to about 500 epoxy equivalents per gram. In some embodiments, the epoxy resin has an epoxy equivalent weight of about 150 to about 450 epoxy equivalents per gram. In some embodiments, the epoxy resin has an epoxy equivalent weight of about 200 to about 400 epoxy equivalents per gram. In some embodiments, the epoxy resin has an epoxy equivalent weight of about 250 to about 350 epoxy equivalents per gram.

In some embodiments, the epoxy resin has an epoxy equivalent weight of about 170 to about 350 epoxy equivalents per gram.

In some embodiments, the epoxy resin has an epoxy value of 2.0 to 8.0, 3.0 to 7.0, or 4.0 to 6.0 epoxy equivalents per kilogram of the epoxy resin. In some embodiments, the epoxy resin has an epoxy value of 2.0 to 8.0 epoxy equivalents per kilogram of the epoxy resin. In some embodiments, the epoxy resin has an epoxy value of 3.0 to 7.0 epoxy equivalents per kilogram of the epoxy resin. In some embodiments, the epoxy resin has an epoxy value of 4.0 to 6.0 epoxy equivalents per kilogram of the epoxy resin.

In some embodiments, the epoxy resin has an epoxy value of 4.5 to 5.5 epoxy equivalents per kilogram of the epoxy resin.

In some embodiments, the epoxy resin further includes a reactive diluent. The type and concentration of reactive diluent may influence the viscosity, flexibility, hardness, chemical resistance, mechanical properties, plasticizing effect, reactivity, crosslinking density, or other properties of the epoxy resin. In some embodiments, the reactive diluent may be added to the epoxy resin to change the viscosity of the epoxy resin, such as to reduce the viscosity of the epoxy resin. In some embodiments, the reactive diluents may be added to improve at least one of the adhesion, the flexibility, and the solvent resistance of the epoxy resin.

In some embodiments, the epoxy resin includes an amount of reactive diluent that reduces the viscosity of the epoxy resin. In some embodiments, the epoxy resin includes an amount of reactive diluent that modifies one or more of the adhesion, flexibility, or solvent resistance of the epoxy resin.

In some embodiments, the reactive diluent is:

a cardanol glycidyl ether derivative;

an aliphatic monoglycidyl ether of a $C_{13-15}$ alcohol;

a compound of formula (III):

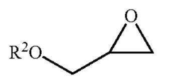

(III)

where $R^2$ is a $C_{12-14}$ hydrocarbyl;

or a combination thereof.

In some embodiments, the reactive diluent is a cardanol glycidyl ether derivative.

In some embodiments, the reactive diluent is an aliphatic monoglycidyl ether of a $C_{13-15}$ alcohol.

In some embodiments, the reactive diluent is a compound of formula (III):

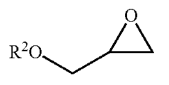

(III)

where $R^2$ is a $C_{12-14}$ hydrocarbyl;

or a combination thereof.

In some embodiments, $R^2$ is $C_{12}$ hydrocarbylenyl. In some embodiments, $R^2$ is $C_{13}$ hydrocarbylenyl. In some embodiments, $R^2$ is $C_{14}$ hydrocarbylenyl.

In some embodiments, $R^2$ is $C_{12-14}$ alkylenyl. In some embodiments, $R^2$ is $C_{12-14}$ alkenylenyl. In some embodiments, $R^2$ is $C_{12-14}$ alkynylenyl. In some embodiments, $R^2$ is $C_{12-14}$ cycloalkylenyl. In some embodiments, $R^2$ is $C_{12-14}$ arylenyl.

In some embodiments, the reactive diluent is propylene glycol diglycidyl ether, butanediol diglycidyl ether, propanetriol triglycidyl ether, an oxirane mono [($C_{12-14}$)-alkyloxy) methyl] derivative, or a combination thereof. In some embodiments, the reactive diluent is propylene glycol diglycidyl ether. In some embodiments, the reactive diluent is butanediol diglycidyl ether. In some embodiments, the reactive diluent is propanetriol triglycidyl ether. In some embodiments, the reactive diluent is an oxirane mono [($C_{12-14}$)-alkyloxy) methyl] derivative.

In some embodiments, the epoxy resin includes about 0.1 wt % to about 50 wt % reactive diluent with respect to the total weight of the epoxy resin.

In some embodiments, the epoxy resin includes about 1.0 wt % to about 30 wt %, about 5.0 wt % to about 20 wt %, or about 10 wt % to about 15 wt % reactive diluent with respect to the total weight of the epoxy resin. In some embodiments, the epoxy resin includes about 1.0 wt % to about 30 wt % reactive diluent with respect to the total weight of the epoxy resin. In some embodiments, the epoxy resin includes about 5.0 wt % to about 20 wt % reactive diluent with respect to the total weight of the epoxy resin. In some embodiments, the epoxy resin includes about 10 wt % to about 15 wt % reactive diluent with respect to the total weight of the epoxy resin.

In some embodiments, the epoxy resin includes about 1.0 wt % reactive diluent with respect to the total weight of the epoxy resin. In some embodiments, the epoxy resin includes about 5.0 wt % reactive diluent with respect to the total weight of the epoxy resin. In some embodiments, the epoxy resin includes about 10 wt % reactive diluent with respect to the total weight of the epoxy resin. In some embodiments, the epoxy resin includes about 15 wt % reactive diluent with respect to the total weight of the epoxy resin. In some embodiments, the epoxy resin includes about 20 wt % reactive diluent with respect to the total weight of the epoxy resin. In some embodiments, the epoxy resin includes about 30 wt % reactive diluent with respect to the total weight of the epoxy resin.

In some embodiments, the epoxy resin includes bisphenol-A-(epichlorohydrin) epoxy resin and an oxirane mono [($C_{12-14}$)-alkyloxy)methyl]derivative and has:

an epoxy value of about 4.76 to about 5.26 epoxy equivalents per kilogram of epoxy resin;

an epoxy equivalent weight of about 190 grams per equivalent (g/eq) to about 210 g/eq; and/or a dynamic viscosity of about 600 mPa·s to about 1200 mPa·s.

In some embodiments, the epoxy resin includes bisphenol-A-(epichlorohydrin) epoxy resin and an oxirane mono [($C_{12-14}$)-alkyloxy)methyl]derivative and has:

an epoxy value of about 4.76 epoxy equivalents per kilogram of epoxy resin to about 5.26 epoxy equivalents per kilogram of epoxy resin;

an epoxy equivalent weight of about 190 g/eq to about 210 g/eq; and/or a dynamic viscosity of about 600 millipascal-second (mPa·s) to about 900 mPa·s.

In some embodiments, the epoxy resin includes 2,3-epoxypropyl-o-tolyl ether and has:

an epoxy equivalent weight of about 170 g/eq to about 190 g/eq; and/or a dynamic viscosity of about 7 mPa·s to about 10 mPa-s.

In some embodiments, the epoxy resin includes an alkyl glycidyl ether of formula (II):

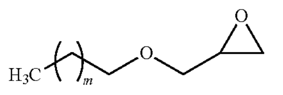

(II)

where m is an integer 10 to 12, and has:

an epoxy equivalent weight of about 270 g/eq to about 305 g/eq; and/or a dynamic viscosity of about 5 mPa·s to about 12 mPa-s.

In some embodiments, the epoxy resin includes 1,6-hexanediol diclycidyl ether and has:

an epoxy equivalent weight of 270 g/eq to 305 g/eq; and/or a dynamic viscosity of 5 mPa·s to 12 mPa-s.

In some embodiments, the epoxy resin has:

an epoxy equivalent weight of about 150 g/eq to about 170 g/eq; and/or a dynamic viscosity of about 20 mPa·s to about 30 mPa·s.

In some embodiments, the epoxy resin is selected from Table 1. In some embodiments, the epoxy resin includes one or more epoxy resin selected from Table 1.

TABLE 1

List of Exemplary Epoxy Resin and Trade Names

| Epoxy Resin | Composition |
|---|---|
| Resin 1 (RAZEEN-2254 or Resin-2254) | bisphenol-A-epichlorohydrin epoxy resin with the reactive diluent oxirane mono [(C12-C14)-alkyloxy)methyl] derivatives |
| Resin 2 | 2,3-epoxypropyl-o-tolyl ether |
| Resin 3 (RAZEEN 7106) | $C_{12-14}$ alkyl glycidyl ether |
| Resin 4 | 1,6-hexanediol diglycidyl ether |
| Resin 5 (WellLock R1) | Bisphenol A/Epichlorohydrin resin and Butyl glycidyl ether Resin |
| Resin 6 | Bisphenol A/Epichlorohydrin and Butyl glycidyl ether and Cyclohexanedimethanol Resin |
| Resin 7 (WellLock R2) | Cyclohexanedimethanol diglydicyl ether |

Crosslinker

The sealant compositions of the present disclosure include a crosslinker. The type of crosslinker and the concentration of the crosslinker in the sealant composition may affect the viscosity of the sealant composition before setting. In some embodiments, the crosslinker increases the viscosity of the sealant composition before setting. In some embodiments, an increased concentration of the crosslinker in the sealant composition increases the viscosity of the sealant composition before setting.

The type of crosslinker and the concentration of the crosslinker in the sealant composition may affect the setting time of the sealant composition. In some embodiments, the crosslinker is used to control the setting time of the sealant composition. In some embodiments, an increased concentration of the crosslinker in the sealant composition decreases the setting time of the sealant composition.

In some embodiments, the crosslinker includes an aliphatic amine, a cycloaliphatic amine, a modified cycloaliphatic amine, an aliphatic polyamine, a cycloaliphatic polyamine, a modified polyamines, an amine adducts, and combinations thereof.

In some embodiments, the crosslinker includes trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine (POPDA), and combinations thereof.

In some embodiments, the crosslinker includes diethylenetriamine (DETA), diethyltoluenediamine (DETDA), polyoxypropylene diamine (POPDA), and combinations thereof.

In some embodiments, the crosslinker includes trimethyl hexamethylene diamine (TMD). In some embodiments, the crosslinker includes meta-xylenediamine (MXDA). In some embodiments, the crosslinker includes aminoethylpiperazine (AEP). In some embodiments, the crosslinker includes tetraethylenepentamine (TEPA). In some embodiments, the crosslinker includes polyetheramine, isophoronediamine (IPDA). In some embodiments, the crosslinker includes beta-hydroxyalkyl amide (HAA). In some embodiments, the crosslinker includes diethylenetriamine (DETA). In some embodiments, the crosslinker includes diethyltoluenediamine (DETDA). In some embodiments, the crosslinker includes polyoxypropylene diamine (POPDA).

In some embodiments, the sealant composition includes about 0.1 wt % to about 50 wt % crosslinker. In some embodiments, the sealant composition includes about 1.0 wt % to about 40 wt % crosslinker. In some embodiments, the sealant composition includes about 5.0 wt % to about 30 wt % crosslinker. In some embodiments, the sealant composition includes about 10 wt % to about 25 wt % crosslinker. In some embodiments, the sealant composition includes about 12 wt % to about 20 wt % crosslinker.

In some embodiments, the sealant composition includes about 1.0 wt % to about 10 wt % crosslinker. In some embodiments, the sealant composition includes about 2.0 wt % to about 9.0 wt % crosslinker. In some embodiments, the sealant composition includes about 3.0 wt % to about 8.0 wt % crosslinker. In some embodiments, the sealant composition includes about 4.0 wt % to about 7.0 wt % crosslinker. In some embodiments, the sealant composition includes about 5.0 wt % to about 6.0 wt % crosslinker.

In some embodiments, the sealant composition includes about 1.0 wt % crosslinker. In some embodiments, the sealant composition includes about 2.0 wt % crosslinker. In some embodiments, the sealant composition includes about 3.0 wt % crosslinker. In some embodiments, the sealant composition includes about 4.0 wt % crosslinker. In some embodiments, the sealant composition includes about 3.5 wt % crosslinker. In some embodiments, the sealant composition includes about 5.0 wt % crosslinker. In some embodiments, the sealant composition includes about 6.0 wt % crosslinker. In some embodiments, the sealant composition includes about 7.0 wt % crosslinker. In some embodiments, the sealant composition includes about 8.0 wt % crosslinker. In some embodiments, the sealant composition includes about 9.0 wt % crosslinker. In some embodiments, the sealant composition includes about 10 wt % crosslinker.

In some embodiments, the crosslinker is selected from Table 2. In some embodiments, the crosslinker includes one or more crosslinkers selected from Table 2.

TABLE 2

List of Exemplary Epoxy Resin and Trade Names

| Crosslinker | Composition |
|---|---|
| Curing Agent 1 (RAZEEN CURE) | 90-100% Diethylenetriamine |
| Curing Agent 2 (Well Lock H1) | Diethyltoluenediamine |
| Curing Agent 3 | Polyoxypropylene Diamine |

Emulsifiers

The sealant compositions of the present disclosure can include an emulsifier. The type of emulsifier and the concentration of the emulsifier in the sealant composition may affect the mixing of the sealant composition.

In some embodiments, the sealant composition further includes an emulsifier.

In some embodiments, the emulsifier is selected Table 3.

In some embodiments, the emulsifier includes one or more emulsifiers selected from Table 3.

TABLE 3

List of Emulsifiers

| Entry No. | Formula and Notes |
|---|---|
| 1 | OXYETHYLATED ALKYL PHENOL |
| 2 | BLEND OF ETHOXYLATED PHENOL AND NONYLPHENOL IN WATER SOLVENT |
| 3 | CARBOXYLIC ACID TERMINATED FATTY POLYAMIDE IN BASE OIL |
| 4 | CARBOXYLIC ACID TERMINATED FATTY POLYAMIDE |
| 5 | MODIFIED AMIDOAMINE IN MINERAL OIL |
| 6 | POLYOLEFIN AMIDE ALKENE AMINE |
| 7 | SOYA LECITHIN (A PHOSPHATIDYL CHOLINE) |
| 8 | DISTILLED TALL OIL FATTY ACID (TOFA) |
| 9 | CARBOXYLIC ACID TERMINATED FATTY POLYAMIDE IN DIESEL BASE |
| 10 | 2/3-AMIDE OF TALL OIL FATTY ACID AND POLYAMINES, SALT |
| 11 | DISTILLED TALL OIL FATTY ACID |
| 12 | OXIDIZED TALL OIL/FATTY AMIDOAMINE BLEND IN DIESEL BASE |
| 13 | OXIDIZED TALL OIL/FATTY AMIDOAMINE BLEND |
| 14 | ETHER CARBOXYLIC ACID |
| 15 | AQUEOUS MIXTURE OF GLYCOLS, PHOSPHATE ESTER, AND ETHANOLAMINE |

In some embodiments, the sealant composition includes about 0.01 wt % to about 50 wt % emulsifier. In some embodiments, the sealant composition includes about 0.1 wt % to about 40 wt % emulsifier. In some embodiments, the sealant composition includes about 1.0 wt % to about 30 wt % emulsifier. In some embodiments, the sealant composition includes about 5.0 wt % to about 25 wt % emulsifier. In some embodiments, the sealant composition includes about 10 wt % to about 20 wt % emulsifier.

In some embodiments, the sealant composition does not include water.

Cement

The sealant compositions of the present disclosure contain cement. In some embodiments, the sealant composition includes about 0.01 wt % to about 75 wt %, about 0.05 wt % to about 60 wt %, about 0.1 wt % to about 50 wt %, about 1.0 wt % to about 40 wt %, about 2.0 wt % to about 30 wt %, about 3.0 wt % to about 20 wt %, about 4.0 wt % to about 10 wt %, or about 5.0 wt % to about 8.0 wt % cement. In some embodiments, the sealant composition includes about 0.01 wt % to about 75 wt % cement. In some embodiments, the sealant composition includes about 0.05 wt % to about 60 wt % cement. In some embodiments, the sealant composition includes about 0.1 wt % to about 50 wt % cement. In some embodiments, the sealant composition includes about 1.0 wt % to about 40 wt % cement. In some embodiments, the sealant composition includes about 2.0 wt % to about 30 wt % cement. In some embodiments, the sealant composition includes about 3.0 wt % to about 20 wt % cement. In some embodiments, the sealant composition includes about 4.0 wt % to about 10 wt % cement. In some embodiments, the sealant composition includes about 5.0 wt % to about 8.0 wt % cement.

In some embodiments, the sealant composition includes about 0.05 wt % to about 75 wt %, about 5 wt % to about 75 wt %, about 10 wt % to about 75 wt %, about 25 wt % to about 75 wt %, or about 50 wt % to about 75 wt % cement. In some embodiments, the sealant composition includes about 0.05 wt % to about 75 wt % cement. In some embodiments, the sealant composition includes about 5 wt % to about 75 wt % cement. In some embodiments, the sealant composition includes about 10 wt % to about 75 wt % cement. In some embodiments, the sealant composition includes about 25 wt % to about 75 wt % cement. In some embodiments, the sealant composition includes about 50 wt % to about 75 wt % cement.

In some embodiments, the sealant composition includes about 0.01 wt % to about 50 wt %, about 0.01 wt % to about 25 wt %, about 0.01 wt % to about 15 wt %, about 0.01 wt % to about 10 wt %, or about 0.01 wt % to about 5 wt % cement. In some embodiments, the sealant composition includes about 0.01 wt % to about 50 wt % cement. In some embodiments, the sealant composition includes about 0.01 wt % to about 25 wt % cement. In some embodiments, the sealant composition includes about 0.01 wt % to about 15 wt % cement. In some embodiments, the sealant composition includes about 0.01 wt % to about 10 wt % cement. In some embodiments, the sealant composition includes about 0.01 wt % to about 5 wt % cement.

In some embodiments, the sealant composition includes about 0.1 wt % to about 10 wt %, about 1 wt % to about 9 wt %, about 1.5 wt % to about 8 wt %, about 2 wt % to about 7 wt %, about 2.5 wt % to about 6 wt %, or about 3 wt % to about 5 wt % cement.

In some embodiments, the sealant composition includes about 0.1 wt % to about 10 wt % cement. In some embodiments, the sealant composition includes about 1 wt % to about 9 wt % cement. In some embodiments, the sealant composition includes about 1.5 wt % to about 8 wt % cement. In some embodiments, the sealant composition includes about 2 wt % to about 7 wt % cement. In some embodiments, the sealant composition includes about 2.5 wt % to about 6 wt % cement. In some embodiments, the sealant composition includes about 3 wt % to about 5 wt % cement.

In some embodiments, the sealant composition includes about 4.0 wt % cement. In some embodiments, the sealant composition includes about 5.3 wt % cement.

In some embodiments, the cement is Portland cement. In some embodiments, the cement is a conventional class A cement. In some embodiments, the cement is a conventional class B cement. In some embodiments, the cement is a conventional class C cement. In some embodiments, the cement is a conventional class G cement. In some embodiments, the cement is a conventional class H cement.

Additional Components

The sealant compositions of the present disclosure can contain one or more additional components. In some embodiments, the sealant composition further includes an accelerator.

In some embodiments, the accelerator is an alcohol, a phenol, an aminoalcohol, an amine, or combinations thereof. In some embodiments, the accelerator is an alcohol. In some embodiments, the accelerator a phenol. In some embodiments, the accelerator is an aminoalcohol. In some embodiments, the accelerator is an amine.

In some embodiments, the accelerator is benzyl alcohol, mono-nonylphenol, triethanolamine (TEA), amino-n-propyl diethanolamine, n,n-dimethyldipropylenetramine, and combinations thereof. In some embodiments, the accelerator is benzyl alcohol. In some embodiments, the accelerator is mono-nonylphenol. In some embodiments, the accelerator is triethanolamine (TEA). In some embodiments, the accelerator is amino-n-propyl diethanolamine. In some embodiments, the accelerator is n,n-dimethyldipropylenetramine.

In some embodiments, the sealant composition includes about 0.01 wt % to about 5.0 wt % accelerator. In some embodiments, the sealant composition includes about 0.1 wt % to about 4.0 wt % accelerator. In some embodiments, the sealant composition includes about 1.0 wt % to about 3.0 wt % accelerator. In some embodiments, the sealant composition includes about 1.5 wt % to about 2.5 wt % accelerator.

In some embodiments, the sealant composition further includes a retarder.

In some embodiments, the retarder is a lignin, a gum, a starch, a lignosulphonate derivative, and combinations thereof. In some embodiments, the retarder is a lignin. In some embodiments, the retarder is a gum. In some embodiments, the retarder is a starch. In some embodiments, the retarder is a lignosulphonate derivative.

In some embodiments, the sealant composition further includes a weighting material.

In some embodiments, the weighting material has a specific gravity about 2 to about 6. In some embodiments, the weighting material has a specific gravity about 3 to about 5.

In some embodiments, the weighting material is sand. In some embodiments, the weighting material is hematite. In some embodiments, the weighting material is barite (barium sulfate). In some embodiments, the weighting material is calcium carbonate. In some embodiments, the weighting material is siderite. In some embodiments, the weighting material is ilmenite. In some embodiments, the weighting material is silica sand. In some embodiments, the weighting material is manganese oxide (MnO). In some embodiments, the weighting material is hausmanite. In some embodiments, the weighting material is manganese tetraoxide ($Mn_3O_4$). In some embodiments, the weighting material is zinc oxide. In some embodiments, the weighting material is zirconium oxide. In some embodiments, the weighting material is iron oxide. In some embodiments, the weighting material is fly ash.

In some embodiments, the sealant composition includes about 0.1 wt % to about 40 wt % weighting material. In some embodiments, the sealant composition includes about 1.0 wt % to about 30 wt % weighting material. In some embodiments, the sealant composition includes about 5.0 wt % to about 20 wt % weighting material. In some embodiments, the sealant composition includes about 10 wt % to about 15 wt % weighting material.

In some embodiments, the sealant composition further includes cardanol liquid, polyacrylate flow agents, and combinations thereof. In some embodiments, the sealant composition further includes cardanol liquid and polyacrylate flow agents. In some embodiments, the sealant composition further includes cardanol liquid. In some embodiments, the sealant composition further includes polyacrylate flow agents.

In some embodiments, the sealant composition does not include an alkaline activator. In some embodiments, the sealant composition does not include a sodium hydroxide solution. In some embodiments, the sealant composition does not include a sodium hydroxide solution having a pH of 10.0 or greater. In some embodiments, the sealant composition does not include a sodium hydroxide solution having a pH of 12.0 or greater.

Sealant Compositions

In some embodiments, the sealant composition includes:

about 1 wt % to about 10 wt % volcanic ash;

about 1 wt % to about 10 wt % cement;

about 70 wt % to about 97 wt % epoxy resin; and about 1 wt % to about 10 wt % crosslinker.

In some embodiments, the sealant composition includes:

about 4.0 wt % volcanic ash;

about 4.0 wt % cement;

about 88.5 wt % epoxy resin; and about 3.5 wt % crosslinker.

In some embodiments, the sealant composition includes:

about 2.7 wt % volcanic ash;

about 5.3 wt % cement;

about 88.5 wt % epoxy resin; and about 3.5 wt % crosslinker.

In some embodiments, the sealant composition includes:

about 1 wt % to about 10 wt % volcanic ash;

about 1 wt % to about 10 wt % cement;

about 70 wt % to about 97 wt % bisphenol-A-epichlorohydrin epoxy resin including an oxirane mono [($C_{12-14}$)-alkyloxy)methyl]derivative; and about 1 wt % to about 10 wt % diethylenetriamine (DETA).

In some embodiments, the sealant composition includes:

about 4.0 wt % volcanic ash;

about 4.0 wt % cement;

about 88.5 wt % bisphenol-A-epichlorohydrin epoxy resin including an oxirane mono [($C_{12-14}$)-alkyloxy) methyl]derivative; and about 3.5 wt % diethylenetriamine (DETA).

In some embodiments, the sealant composition includes:

about 2.7 wt % volcanic ash;

about 5.3 wt % cement;

about 88.5 wt % bisphenol-A-epichlorohydrin epoxy resin including an oxirane mono [($C_{12-14}$)-alkyloxy) methyl]derivative; and about 3.5 wt % diethylenetriamine (DETA).

In some embodiments, the sealant composition has a density of about 25 pound mass per cubic foot ($lbm/ft^3$) to about 250 $lbm/ft^3$. In some embodiments, the sealant composition has a density of about 35 $lbm/ft^3$ to about 225 $lbm/ft^3$. In some embodiments, the sealant composition has a density of about 45 $lbm/ft^3$ to about 200 $lbm/ft^3$. In some embodiments, the sealant composition has a density of about 55 $lbm/ft^3$ to about 170 $lbm/ft^3$. In some embodiments, the sealant composition has a density of about 60 $lbm/ft^3$ to about 140 $lbm/ft^3$. In some embodiments, the sealant composition has a density of about 65 $lbm/ft^3$ to about 110 $lbm/ft^3$. In some embodiments, the sealant composition has a density of about 70 $lbm/ft^3$ to about 80 $lbm/ft^3$.

In some embodiments, the sealant composition has a density of about 25 $lbm/ft^3$. In some embodiments, the sealant composition has a density of about 35 $lbm/ft^3$. In some embodiments, the sealant composition has a density of about 45 $lbm/ft^3$. In some embodiments, the sealant composition has a density of about 55 $lbm/ft^3$. In some embodiments, the sealant composition has a density of about 65 $lbm/ft^3$. In some embodiments, the sealant composition has a density of about 70 $lbm/ft^3$. In some embodiments, the sealant composition has a density of about 72 $lbm/ft^3$. In some embodiments, the sealant composition has a density of about 75 $lbm/ft^3$. In some embodiments, the sealant composition has a density of about 80 $lbm/ft^3$. In some embodiments, the sealant composition has a density of about 110 $lbm/ft^3$. In some embodiments, the sealant composition has a density of about 140 $lbm/ft^3$. In some embodiments, the sealant composition has a density of about 170 $lbm/ft^3$. In some embodiments, the sealant composition has a density of about 200 $lbm/ft^3$. In some embodiments, the sealant composition has a density of about 225 $lbm/ft^3$. In some embodiments, the sealant composition has a density of about 250 $lbm/ft^3$.

Thickening time is a measurement of the time during which the sealant composition remains in a fluid state and is capable of being pumped. In some embodiments, the thickening time is measured from the time that mixing stops after the addition of red mud, epoxy resin, crosslinker, accelerator, retarder, weighting material, and/or emulsifier until the sealant composition can no longer be pumped.

In some embodiments, the sealant composition has a thickening time of about 0.5 hours (h) to about 12.0 h at 38° C. In some embodiments, the sealant composition has a thickening time of about 1.0 h to about 10.0 h at 38° C. In some embodiments, the sealant composition has a thickening time of about 2.0 h to about 8.0 h at 38° C. In some embodiments, the sealant composition has a thickening time of about 3.0 h to about 6.0 h at 38° C. In some embodiments, the sealant composition has a thickening time of about 4.0 h to about 5.0 h at 38° C.

In some embodiments, the sealant composition has a thickening time of about 6.0 h to about 7.0 h at 38° C.

In some embodiments, the sealant composition has a thickening time of greater than about 0.5 h, about 1.0 h, about 1.25 h, about 1.5 h, about 1.75 h, about 2.0 h, about 2.5 h, about 3.0 h, about 3.5 h, about 4.0 h, about 5.0 h, about 6.0 h, about 7.0 h, about 8.0 h, about 10.0 h, or about 12.0 h at 38° C.

In some embodiments, the sealant composition has a thickening time of greater than about 1.0 h at 38° C. In some embodiments, the sealant composition has a thickening time of greater than about 1.25 h at 38° C. In some embodiments, the sealant composition has a thickening time of greater than about 1.5 h at 38° C. In some embodiments, the sealant composition has a thickening time of greater than about 1.75 h at 38° C. In some embodiments, the sealant composition has a thickening time of greater than about 2.0 h at 38° C. In some embodiments, the sealant composition has a thickening time of greater than about 2.5 h at 38° C. In some embodiments, the sealant composition has a thickening time of greater than about 3.0 h at 38° C. In some embodiments, the sealant composition has a thickening time of greater than about 3.5 h at 38° C. In some embodiments, the sealant composition has a thickening time of greater than about 4.0 h at 38° C. In some embodiments, the sealant composition has a thickening time of greater than about 5.0 h at 38° C. In some embodiments, the sealant composition has a thickening time of greater than about 6.0 h at 38° C. In some embodiments, the sealant composition has a thickening time of greater than about 8.0 h at 38° C. In some embodiments, the sealant composition has a thickening time of greater than about 10.0 h at 38° C. In some embodiments, the sealant composition has a thickening time of greater than about 12.0 h at 38° C.

In some embodiments, the sealant composition has a thickening time of about 0.5 h to about 15.0 h at room temperature. In some embodiments, the sealant composition has a thickening time of about 5.0 h to about 8.0 h at room temperature.

In some embodiments, the sealant composition has a thickening time of greater than about 0.5 h, about 1.0 h, about 2.0 h, about 5.0 h, about 6.0 h, about 7.0 h, about 8.0 h, about 10.0 h, or about 15.0 h at room temperature.

In some embodiments, the sealant composition has a curing time of about 2.0 h to about 10.0 h. In some embodiments, the sealant composition has a curing time of about 3.0 h to about 8.0 h. In some embodiments, the sealant composition has a curing time of about 4.0 h to about 6.0 h.

Curing time is a measurement of the time during which the sealant composition reaches maximum hardness. In some embodiments, the curing time is measured from the time that mixing stops after the addition of red mud, epoxy resin, crosslinker, accelerator, retarder, weighting material, and/or emulsifier until the sealant composition reaches maximum hardness.

In some embodiments, the sealant composition has a curing time of about 2.0 h. In some embodiments, the sealant composition has a curing time of about 3.0 h. In some embodiments, the sealant composition has a curing time of about 4.0 h. In some embodiments, the sealant composition has a curing time of about 5.0 h. In some embodiments, the sealant composition has a curing time of about 6.0 h. In some embodiments, the sealant composition has a curing time of about 7.0 h. In some embodiments, the sealant composition has a curing time of about 8.0 h. In some embodiments, the sealant composition has a curing time of about 9.0 h. In some embodiments, the sealant composition has a curing time of about 10.0 h.

Methods of Preparing Sealant Compositions

The present disclosure relates to methods of preparing sealant compositions including red mud; cement; an epoxy resin; and a crosslinker, the method including:

- combining liquid materials, including the epoxy resin and the crosslinker;
- mixing the liquid materials;
- combining solid materials with the liquid materials, where the solid materials include volcanic ash and cement;
- mixing the combined solid materials and liquid materials, thereby forming the sealant composition.

In some embodiments, an emulsifier is combined with the epoxy resin and the crosslinker.

In some embodiments, the liquid materials are mixed for about 0.5 minutes (min) to about 60 min, about 1 min to about 30 min, about 2 min to about 15 min, or about 3 min to about 5 min. In some embodiments, the liquid materials are mixed for about 0.5 min to about 60 min. In some embodiments, the liquid materials are mixed for about 1 min to about 30 min. In some embodiments, the liquid materials are mixed for about 2 min to about 15 min. In some embodiments, the liquid materials are mixed for about 3 min to about 5 min.

In some embodiments, the combined solid materials and liquid materials are mixed for about 0.5 min to about 60 min, about 1 min to about 30 min, about 2 min to about 15 min, or about 3 min to about 5 min. In some embodiments, the combined solid materials and liquid materials are mixed for about 0.5 min to about 60 min. In some embodiments, the combined solid materials and liquid materials are mixed for about 1 min to about 30 min. In some embodiments, the combined solid materials and liquid materials are mixed for about 2 min to about 15 min. In some embodiments, the combined solid materials and liquid materials are mixed for about 3 min to about 5 min.

In some embodiments, the combined solid materials and liquid materials are mixed until the sealant composition is homogeneous.

Methods of Servicing a Wellbore The present disclosure relates to methods of servicing a wellbore, including: applying a sealant composition to the wellbore, the sealant composition including: volcanic ash; cement; an epoxy resin; and a crosslinker.

In some embodiments, the method further comprises: mixing the epoxy resin and the crosslinker to form a liquid mixture; and adding the volcanic ash and cement to the liquid mixture to form the sealant composition; before applying the sealant composition to the wellbore.

In some embodiments, servicing the wellbore comprises completing the wellbore. In some embodiments, servicing the wellbore comprises primary or secondary cement of the wellbore. In some embodiments, servicing the wellbore comprises reestablishing circulation following a loss of circulation in the wellbore. In some embodiments, servicing the wellbore comprises sealing a permeable zone in the wellbore.

In some embodiments, an emulsifier is mixed with the epoxy resin and the crosslinker to form the liquid mixture.

In some embodiments, the liquid mixture is mixed for about 0.5 min to about 30 min, about 1 min to about 15 min, about 2 min to about 10 min, or about 3 min to about 5 min to form the liquid mixture.

In some embodiments, the liquid mixture is mixed for about 0.5 min to about 30 min to form the liquid mixture. In some embodiments, the liquid mixture is mixed for about 1 min to about 15 min to form the liquid mixture. In some embodiments, the liquid mixture is mixed for about 2 min to about 10 min to form the liquid mixture. In some embodiments, the liquid mixture is mixed for about 3 min to about 5 min to form the liquid mixture.

In some embodiments, the sealant composition is mixed for about 0.5 min to about 30 min, about 1 min to about 15 min, about 2 min to about 10 min, or about 3 min to about 5 min after adding the volcanic ash and cement.

In some embodiments, the sealant composition is mixed for about 0.5 min to about 30 min after adding the volcanic ash and cement. In some embodiments, the sealant composition is mixed for about 1 min to about 15 min after adding the volcanic ash and cement. In some embodiments, the sealant composition is mixed for about 2 min to about 10 min after adding the volcanic ash and cement. In some embodiments, the sealant composition is mixed for about 3 min to about 5 min after adding the volcanic ash and cement.

In some embodiments, the cured sealant composition is capable of withstanding about 10 pounds per square inch (psi) to about 5,000,000 psi without failing or deteriorating to allow liquids or gases to penetrate into or through the cured sealant composition. In some embodiments, the cured sealant composition is capable of withstanding about 14 psi to about 4,000,000 psi without failing or deteriorating to allow liquids or gases to penetrate into or through the cured sealant composition. In some embodiments, the cured sealant composition is capable of withstanding about 1,000 psi to about 3,500,000 psi without failing or deteriorating to allow liquids or gases to penetrate into or through the cured sealant composition. In some embodiments, the cured sealant composition is capable of withstanding about 10,000 psi to about 3,000,000 psi without failing or deteriorating to allow liquids or gases to penetrate into or through the cured sealant composition. In some embodiments, the cured sealant composition is capable of withstanding about 100,000 psi to about 2,500,000 psi without failing or deteriorating to allow liquids or gases to penetrate into or through the cured sealant composition. In some embodiments, the cured sealant composition is capable of withstanding about 1,000,000 psi to about 2,000,000 psi without failing or deteriorating to allow liquids or gases to penetrate into or through the cured sealant composition.

In some embodiments, the cured sealant composition is capable of withstanding about 10 psi without failing or deteriorating to allow liquids or gases to penetrate into or through the cured sealant composition. In some embodiments, the cured sealant composition is capable of withstanding about 14 psi without failing or deteriorating to allow liquids or gases to penetrate into or through the cured sealant composition. In some embodiments, the cured sealant composition is capable of withstanding about 1,000 psi without failing or deteriorating to allow liquids or gases to penetrate into or through the cured sealant composition. In some embodiments, the cured sealant composition is capable of withstanding about 10,000 psi without failing or deteriorating to allow liquids or gases to penetrate into or through the cured sealant composition. In some embodiments, the cured sealant composition is capable of withstanding about 100,000 psi without failing or deteriorating to allow liquids or gases to penetrate into or through the cured sealant composition. In some embodiments, the cured sealant composition is capable of withstanding about 1,000,000 psi without failing or deteriorating to allow liquids or gases to penetrate into or through the cured sealant composition. In some embodiments, the cured sealant composition is capable of withstanding about 1,500,000 psi without failing or deteriorating to allow liquids or gases to penetrate into or through the cured sealant composition. In some embodiments, the cured sealant composition is capable of withstanding about 2,000,000 psi without failing or deteriorating to allow liquids or gases to penetrate into or through the cured sealant composition. In some embodiments, the cured sealant composition is capable of withstanding about 2,500,000 psi without failing or deteriorating to allow liquids or gases to penetrate into or through the cured sealant composition. In some embodiments, the cured sealant composition is capable of withstanding about 3,000,000 psi without failing or deteriorating to allow liquids or gases to penetrate into or through the cured sealant composition. In some embodiments, the cured sealant composition is capable of withstanding about 3,500,000 psi without failing or deteriorating to allow liquids or gases to penetrate into or through the cured sealant composition. In some embodiments, the cured sealant composition is capable of withstanding about 4,000,000 psi without failing or deteriorating to allow liquids or gases to penetrate into or through the cured sealant composition. In some embodiments, the cured sealant composition is capable of withstanding about 4,500,000 psi without failing or deteriorating to allow liquids or gases to penetrate into or through the cured sealant composition. In some embodiments, the cured sealant composition is capable of withstanding about 5,000,000 psi without failing or deteriorating to allow liquids or gases to penetrate into or through the cured sealant composition.

In some embodiments, the cured sealant composition is capable of withstanding temperatures of about 10° C. to about 225° C. without failing or deteriorating to allow liquids or gases to penetrate into or through the cured sealant composition. In some embodiments, the cured sealant composition is capable of withstanding temperatures of about 20° C. to about 205° C. without failing or deteriorating to allow liquids or gases to penetrate into or through the cured sealant composition. In some embodiments, the cured sealant composition is capable of withstanding temperatures of about 40° C. to about 200° C. without failing or deteriorating to allow liquids or gases to penetrate into or through the cured sealant composition. In some embodiments, the cured sealant composition is capable of withstanding temperatures of about 60° C. to about 180° C. without failing or deteriorating to allow liquids or gases to penetrate into or through the cured sealant composition. In some embodiments, the cured sealant composition is capable of withstanding temperatures of about 80° C. to about 160° C. without failing or deteriorating to allow liquids or gases to penetrate into or through the cured sealant composition. In some embodiments, the cured sealant composition is capable of withstanding temperatures of about 100° C. to about 140° C. without failing or deteriorating to allow liquids or gases to penetrate into or through the cured sealant composition.

In some embodiments, the cured sealant composition is capable of withstanding temperatures of about 20° C. without failing or deteriorating to allow liquids or gases to penetrate into or through the cured sealant composition. In some embodiments, the cured sealant composition is capable of withstanding temperatures of about 40° C. without failing or deteriorating to allow liquids or gases to penetrate into or through the cured sealant composition. In some embodiments, the cured sealant composition is capable of withstanding temperatures of about 60° C. without failing or deteriorating to allow liquids or gases to penetrate into or through the cured sealant composition. In some embodiments, the cured sealant composition is capable of withstanding temperatures of about 80° C. without failing or deteriorating to allow liquids or gases to penetrate into or through the cured sealant composition. In some embodiments, the cured sealant composition is capable of withstanding temperatures of about 100° C. without failing or deteriorating to allow liquids or gases to penetrate into or through the cured sealant composition. In some embodiments, the cured sealant composition is capable of withstanding temperatures of about 120° C. without failing or deteriorating to allow liquids or gases to penetrate into or through the cured sealant composition. In some embodiments, the cured sealant composition is capable of withstanding temperatures of about 140° C. without failing or deteriorating to allow liquids or gases to penetrate into or through the cured sealant composition. In some embodiments, the cured sealant composition is capable of withstanding temperatures of about 160° C. without failing or deteriorating to allow liquids or gases to penetrate into or through the cured sealant composition. In some embodiments, the cured sealant composition is capable of withstanding temperatures of about 180° C. without failing or deteriorating to allow liquids or gases to penetrate into or through the cured sealant composition. In some embodiments, the cured sealant composition is capable of withstanding temperatures of about 200° C. without failing or deteriorating to allow liquids or gases to penetrate into or through the cured sealant composition. In some embodiments, the cured sealant composition is capable of withstanding temperatures of about 205° C. without failing or deteriorating to allow liquids or gases to penetrate into or through the cured sealant composition. In some embodiments, the cured sealant composition is capable of withstanding temperatures of about 225° C. without failing or deteriorating to allow liquids or gases to penetrate into or through the cured sealant composition.

EXAMPLES

Example 1. Analysis of Volcanic Ash Samples

Wavelength Dispersive X-ray Fluorescence (WDXRF) was be used to conduct elemental analysis of a Saudi Arabian volcanic ash sample. A sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The composition is shown in Table 4.

TABLE 4

WDXRF Analysis of a Volcanic ash Sample

| Component | Weight Percentage (%) |
|---|---|
| Amorphous Material | 70 |
| Labradorite ($Ca_{0.65}Na_{0.32}(Al_{1.62}Si_{2.38}O_8)$) | 19 |
| Augite ($Ca(Fe,Mg)Si_2O_6$) | 6 |
| Forsterite ($Mg_2SiO_4$) | 5 |

Wavelength Dispersive X-ray Fluorescence (WDXRF) was used to conduct elemental analysis of a Saudi Arabian volcanic ash sample. A sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The elemental analysis of the volcanic ash sample is shown in Table 5.

TABLE 5

Elemental Analysis of Volcanic Ash Samples

| Element | Wt % |
|---|---|
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

Example 2. Preparation and Evaluation of Sealant Compositions

Two testing formulations were prepared for further evaluation, Formula #1 and Formula #2. The composition and density of each of Formula #1 and Formula #2 is summarized below in Table 6.

TABLE 6

Composition and Density of Formula #1 and Formula #2

| | Formulation #1 | | Formulation #2 | |
|---|---|---|---|---|
| Test Formulation Additive | Weight Percentage (%) | Weight (g) | Weight Percentage (%) | Weight (g) |
| Resin-2254 (Epoxy Resin) | 88.5% | 100 g | 88.5% | 100 g |
| Razeen cure-931 (Curing Agent) | 3.5% | 4 g | 3.5% | 4 g |
| Volcanic ash | 4.0% | 4.5 g | 2.7% | 3 g |
| Cement | 4.0% | 4.5 g | 5.3% | 6 g |
| Density | 72 lbm/ft$^3$ | | 72 lbm/ft$^3$ | |

Example 3. Evaluation of the Rheology of Formulation #1

A sealant composition slurry having volcanic ash behaves as a rigid body at lesser shear stress but flows as a viscous fluid at a greater shear stress. The rheological behavior of the sealant composition may be determined by measuring the shear stress on the resin system at different shear rates, which may be accomplished by measuring the shear stress and/or shear rate on the resin system using a FANN® Model 35 viscometer operated at 3 rpm, 6 rpm, 100 rpm, 200 rpm, 300 rpm, or 600 rpm, for example. A Bingham plastic fluid may be modeled by Equation 1.

$$\tau=(PV)\dot{\gamma}+4.79YP \quad \text{Equation 1}$$

where $\tau$=shear stress (measured in dynes per square centimeter (dyne/cm$^2$))

PV=plastic viscosity (measured in cP)

$\dot{\gamma}$=shear rate (measured in s$^{-1}$)

YP=yield point (measured in lbf/100 ft$^2$)

The rheology of the sealant composition slurry may be evaluated from the plastic viscosity (PV) and the yield point (YP), which are parameters from the Bingham plastic rheology model. PV is related to the resistance of the sealant composition to flow due to mechanical interaction between the solids of the mixture and represents the viscosity of the sealant composition slurry extrapolated to infinite shear rate. In other words, the PV is the slope of the shear stress versus shear rate curve of the Bingham plastic model. The PV reflects the type and concentration of the solids in the sealant composition, and a lesser PV is preferred. The PV of the sealant composition may be estimated by measuring the shear stress of the sealant composition using a FANN® Model 35 viscometer at shear rates of 300 rpm and 600 rpm and subtracting the 300 rpm shear stress measurement from the 600 rpm shear stress measurement according to Equation 2.

$$PV=\theta_{600}-\theta_{300} \quad \text{Equation 2}$$

where

PV=plastic viscosity (measured in cP)

$\theta_{600}$=shear stress viscometer reading at 600 rpm (measured in lbf/100 ft$^2$)

$\theta_{300}$=shear stress viscometer reading at 300 rpm (measured in lbf/100 ft$^2$)

YP represents the shear stress less than which the sealant composition behaves as a rigid body and greater than which the sealant composition flows as a viscous fluid. In other words, the YP represents the amount of stress required to move the resin system from a static condition. The yield point is the resistance of initial flow of a fluid, or the stress required in order to move the fluid. It can be simply stated that the yield point is the attractive force among colloidal particles in the resin system mixture. The YP of the resin system composition may be estimated from the PV from Equation 1 by subtracting the PV from Equation 3 from the shear stress of the sealant composition measured at 300 rpm according to Equation 3.

$$YP=\theta_{300}-PV \quad \text{Equation 3}$$

The YP is expressed as a force per area, such as in field units of lbf/100 ft$^2$, for example. The YP may be converted to SI units of dyne/cm$^2$, as 1 lbf/100 ft$^2$=4.79 dyne/cm$^2$. The rheology of Formulation #1 was evaluated at room temperature. The results are summarized below in Table 7.

TABLE 7

Rheology Testing of Formulation #1

| Shear Stress | Yield Point Readings (pound per 100 square feet (lbf/100 ft$^2$)) |
|---|---|
| 300 rpm | Over range |
| 200 rpm | Over range |
| 100 rpm | 195 |
| 60 rpm | 145 |
| 30 rpm | 8 |
| 6 rpm | 21 |
| 3 rpm | 12 |
| 10 s | 9 |
| 10 min | 9 |

Example 4. Evaluation of the Thickening Time of Formulation #1 and Formulation #2

Figure 2:
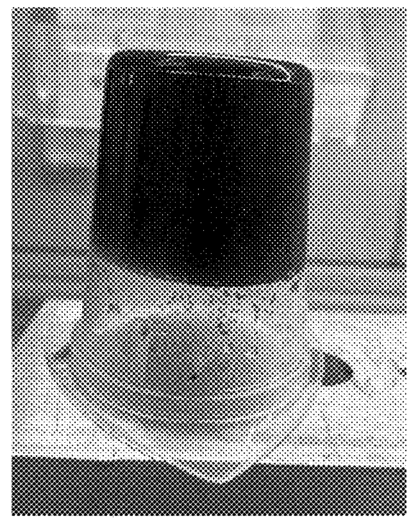
FIG. 2 is a photograph showing an exemplary sealant composition including volcanic ash, cement, resin-2254 as the epoxy resin, and Razeen cure-931 as the crosslinker in solid form in a plastic cup.

The thickening time of Formulation #1 and Formulation #2 were evaluated at room temperature. Visual measurement and observation were used to evaluate the thickening time of each formulation. The results are summarized below in Table 8. FIG. 1 shows a photograph of Formulation #1 before thickening and FIG. 2 shows a photograph of Formulation #2 after thickening.

TABLE 8

Summary of Thickening Time for Formulation #1 and Formulation #2

| Formulation | Time for the sample to start gelling and become viscous, un-pumpable | Thickening time to a complete rigid material |
|---|---|---|
| Formulation #1 | 3 h 30 min | 7 h |
| Formulation #2 | 3 h | 6 h 30 min |

Example 5. Servicing a Wellbore

A sealant composition (e.g., Formulation #1 or Formulation #2) is prepared by combining any liquid materials, including an epoxy resin, a crosslinker, and, if using, an emulsifier, and mixing for 3 to 5 minutes. The volcanic ash and cement are then added to the liquid materials, and the resulting mixture is mixed for 3 to 5 minutes until the formulation is homogeneous, thereby forming the sealant composition. The resulting sealant composition can then be pumped downhole into a wellbore.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Embodiments

Embodiment 1. A method of servicing a wellbore, comprising:

applying a sealant composition to the wellbore, the sealant composition comprising:
volcanic ash;
cement;
an epoxy resin; and
a crosslinker.

Embodiment 2. The method of embodiment 1, wherein the sealant composition comprises from about 0.01 wt % to about 75 wt % volcanic ash.

Embodiment 3. The method of embodiment 1 or 2, wherein the sealant composition comprises from about 1 wt % to about 5 wt % volcanic ash.

Embodiment 4. The method of any one of embodiments 1-3, wherein about 80% of the volcanic ash particles have a diameter of less than about 60 μm.

Embodiment 5. The method of any one of embodiments 1-5, wherein the sealant composition comprises from about 50 wt % to about 97 wt % epoxy resin.

Embodiment 6. The method of any one of embodiments 1-5, wherein the sealant composition comprises from about 85 wt % to about 95 wt % epoxy resin.

Embodiment 7. The method of any one of embodiments 1-6, wherein the epoxy resin comprises:

an aliphatic epoxy resin of formula (I):

(I)

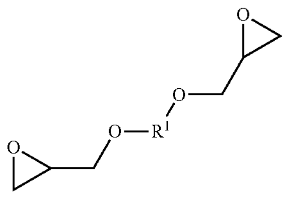

wherein $R^1$ is $C_{4-24}$ hydrocarbylenyl;

an alkyl glycidyl ether of formula (II):

(II)

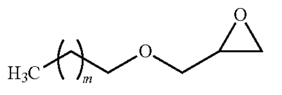

wherein m is an integer from 10 to 12;

a bisphenol-A-based epoxy resin;

a bisphenol-F-based epoxy resin;

a Novalak resin; or combinations thereof.

Embodiment 8. The method of any one of embodiments 1-6, wherein the epoxy resin comprises 1,6-hexanediol diglycidyl ether, butyl glycidyl ether, 2,3-epoxypropyl o-tolyl ether, cyclohexanedimethanol diglydicyl ether, bisphenol-A-epichlorohydrin epoxy, resin-2254, or combinations thereof.

Embodiment 9. The method of any one of embodiments 1-8, wherein the epoxy resin further comprises a reactive diluent selected from:

a cardanol glycidyl ether derivative;

an aliphatic monoglycidyl ether of a $C_{13-15}$ alcohol;

a compound of formula (III):

(III)

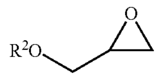

wherein $R^2$ is a $C_{12-14}$ hydrocarbyl;

or a combination thereof.

Embodiment 10. The method of any one of embodiments 1-6, wherein the epoxy resin comprises bisphenol-A-(epichlorohydrin) epoxy resin and an oxirane mono [($C_{12-14}$)-alkyloxy)methyl]derivative.

Embodiment 11. The method of any one of embodiments 1-10, wherein the sealant composition comprises from about 1 wt % to about 5 wt % crosslinker selected from trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyltoluenediamine (DETDA), polyoxypropylene diamine (POPDA), and combinations thereof.

Embodiment 12. The method of any one of embodiments 1-11, wherein the sealant composition further comprises an accelerator, retarder, and/or weighting material.

Embodiment 13. The method of any one of embodiments 1-12, wherein the sealant composition further comprises an emulsifier selected from Table 3.

Embodiment 14. The method of embodiment 13, wherein the sealant composition comprises from about 0.01 wt % to about 50 wt % emulsifier.

Embodiment 15. The method of any one of embodiments 1-14, wherein the sealant composition comprises from about 1 wt % to about 10 wt % cement.

Embodiment 16. The method of embodiment 1, wherein the sealant composition comprises:

about 1 wt % to about 10 wt % volcanic ash;
about 1 wt % to about 10 wt % cement;
about 70 wt % to about 97 wt % epoxy resin; and
about 1 wt % to about 10 wt % crosslinker.

Embodiment 17. The method of embodiment 1, wherein the sealant composition comprises:

about 1 wt % to about 10 wt % volcanic ash;
about 1 wt % to about 10 wt % cement;
about 70 wt % to about 97 wt % bisphenol-A-epichlorohydrin epoxy resin comprising an oxirane mono [($C_{12-14}$)-alkyloxy)methyl]derivative; and
about 1 wt % to about 10 wt % diethylenetriamine (DETA).

Embodiment 18. The method of any one of embodiments 1-17, wherein the method further comprises:

mixing the epoxy resin and the crosslinker to form a liquid mixture; and adding the volcanic ash and cement to the liquid mixture to form the sealant composition;

before applying the sealant composition to the wellbore.

Embodiment 19. The method of any one of embodiments 1-18, wherein an emulsifier is mixed with the epoxy resin and the crosslinker to form the liquid mixture.

Embodiment 20. The method of any one of embodiments 1-18, wherein:

the liquid mixture is mixed for about 3 min to about 5 min to form the liquid mixture; and the sealant composition is mixed for about 3 min to about 5 min after adding the volcanic ash and cement.

Embodiment 21. The method of any one of embodiments 1-20, wherein servicing the wellbore comprises completing the wellbore.

Embodiment 22. The method of any one of embodiments 1-20, wherein, servicing the wellbore comprises primary or secondary cement of the wellbore.

Embodiment 23. The method of any one of embodiments 1-20, wherein servicing the wellbore comprises reestablishing circulation following a loss of circulation in the wellbore.

Embodiment 24. The method of any one of embodiments 1-20, wherein servicing the wellbore comprises sealing a permeable zone in the wellbore.

What is claimed is:

1. A method of servicing a wellbore, comprising:

applying a sealant composition to the wellbore, the sealant composition comprising:

about 1 wt % to about 10 wt % of volcanic ash;

about 1 wt % to 10 wt % of cement;

about 5 wt % to 95 wt % of epoxy resin comprising bisphenol-A-epichlorohydrin and an oxirane mono [($C_{12-14}$)-alkyloxy)methyl] derivative; and about 1 wt % to about 10 wt % of crosslinker comprising diethylenetriamine (DETA);

wherein the sealant composition does not comprise an alkaline activator.

2. The method of claim 1, wherein the sealant composition comprises from about 1 wt % to about 5 wt % of the volcanic ash.

3. The method of claim 1, wherein the volcanic ash comprises particles having a diameter from about 10 μm to about 100 μm.

4. The method of claim 3, wherein about 80% of the volcanic ash particles have a diameter of about 60 μm or less.

5. The method of claim 1, wherein the sealant composition comprises from about 1 wt % to about 5 wt % of the crosslinker.

6. The method of claim 1, wherein the sealant composition further comprises an accelerator, a retarder, a weighting material, or combinations thereof.

7. The method of claim 1, wherein the sealant composition further comprises an emulsifier selected from oxyethylated alkyl phenol; blend of ethoxylated phenol and nonylphenol; carboxylic acid terminated fatty polyamide; carboxylic acid terminated fatty polyamide; modified amidoamine in mineral oil; polyolefin amide alkene amine; soya lecithin; distilled tall oil fatty acid (TOFA); tall oil/fatty amidoamine blend; ether carboxylic acid; and aqueous mixture of glycols, phosphate ester and ethanolamine.

8. The method of claim 7, wherein the sealant composition comprises from about 0.01 wt % to about 50 wt % of the emulsifier.

9. The method of claim 1, wherein the method further comprises:

mixing the epoxy resin and the crosslinker to form a liquid mixture; and adding the volcanic ash and cement to the liquid mixture to form the sealant composition;

before applying the sealant composition to the wellbore.

10. The method of claim 9, wherein an emulsifier is mixed with the epoxy resin and the crosslinker to form the liquid mixture.

11. The method of claim 9, wherein:

the epoxy resin and crosslinker are mixed for about 3 min to about 5 min before adding the volcanic ash and cement; and the sealant composition is mixed for about 3 min to about 5 min after adding the volcanic ash and cement.

12. The method of claim 1, wherein the sealant composition comprises:

about 4.0 wt % of the volcanic ash;

about 88.5 wt % of the epoxy resin;

about 3.5 wt % of the crosslinker; and about 4.0 wt % of the cement.

13. The method of claim 1, wherein the sealant composition comprises:

about 2.7 wt % of the volcanic ash;

about 88.5 wt % of the epoxy resin;

about 3.5 wt % of the crosslinker; and about 5.3 wt % of the cement.

14. A method of servicing a wellbore, comprising:

applying a sealant composition to the wellbore, the sealant composition comprising:

about 1 wt % to about 10 wt % of volcanic ash, wherein the volcanic ash comprises particles having a diameter from about 10 μm to about 100 μm;

about 1 wt % to 10 wt % of cement;

about 85 wt % to 95 wt % of epoxy resin consisting essentially of bisphenol-A-epichlorohydrin and derivatives of oxirane mono [($C_{12-14}$)-alkyloxy)methyl]; and about 1 wt % to about 5 wt % of crosslinker consisting essentially of diethylenetriamine (DETA).

15. The method of claim 14, wherein about 80% of the volcanic ash particles have a diameter of about 60 μm or less.

16. The method of claim 14, wherein the sealant composition further comprises an accelerator, a retarder, a weighting material, or combinations thereof.

17. The method of claim 14, wherein the sealant composition further comprises from about 0.01 wt % to about 50 wt % of an emulsifier chosen from one or more of oxyethylated alkyl phenol; blends of ethoxylated phenol and nonylphenol; carboxylic acid terminated fatty polyamide; carboxylic acid terminated fatty polyamide; modified amidoamine in mineral oil; polyolefin amide alkene amine; soya lecithin; distilled tall oil fatty acid (TOFA); tall oil/fatty amidoamine blends; ether carboxylic acid; or aqueous mixtures of glycols, phosphate ester and ethanolamine.

* * * * *